May 6, 1930.  H. C. BECKMAN  1,757,035
APPARATUS FOR CLEANING TEAT CUPS
Filed April 18, 1928  2 Sheets-Sheet 2

INVENTOR
Herman C. Beckman
BY
Busser and Harding
ATTORNEYS.

Patented May 6, 1930

1,757,035

UNITED STATES PATENT OFFICE

HERMAN C. BECKMAN, OF CHICAGO, ILLINOIS, ASSIGNOR TO THE DE LAVAL SEPARATOR COMPANY, OF NEW YORK, N. Y., A CORPORATION OF NEW JERSEY

APPARATUS FOR CLEANING TEAT CUPS

Application filed April 18, 1928. Serial No. 270,853.

In an application filed by me March 27, 1928, Serial No. 265,127, I set forth a device for the suspension of milking machine teat cups in such manner that the teat cups, the pulsator claw (if a claw forms a part of the unit and it is desired to clean the milk cluster thereof) and the milk tubes, may be filled with a cleaning liquid, preferably a sterilizing fluid, and retain such fluid until the teat cups are again used, just before which the sterilizing fluid may be discharged.

The object of the present invention is to provide means for washing out the teat cups, and also sterilizing them, if desired, before the admission of the sterilizing fluid which is to remain in the teat cups while they are out of operation. The means embodying the present invention are arranged and adapted to be used in connection with the device set forth in my said application, but such means are also adapted for independent use.

Preferred embodiments of the invention are shown in the drawings, in which—

Figure 1:
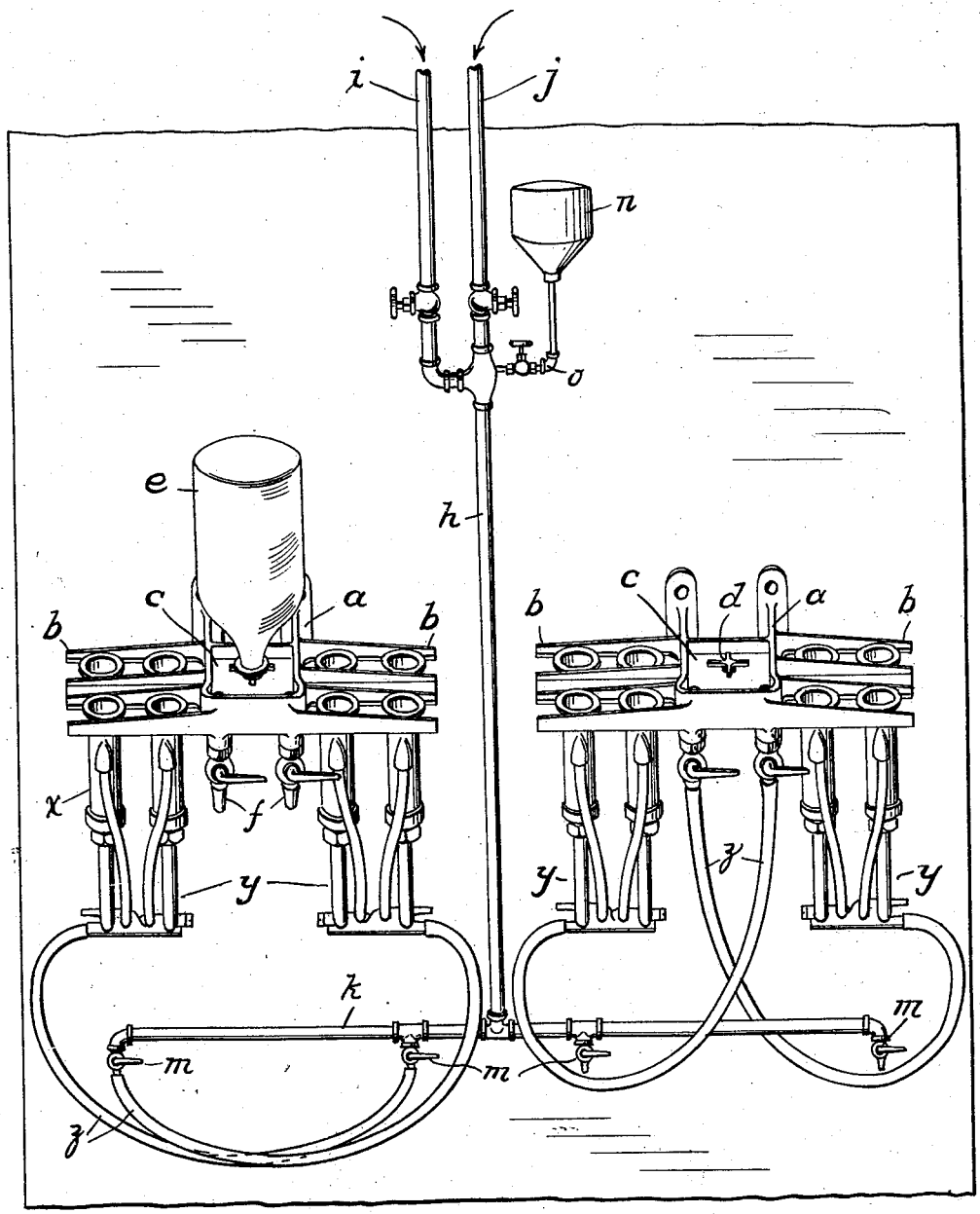
Fig. 1 is a perspective view of a complete apparatus embodying my invention.

Referring first to the construction shown in Fig. 1:

A frame $a$, provided with two pairs of racks $b$ adapted to support teat cups $x$ by means of their overhanging flanges, supports a central container $c$ for cleaning fluid and a support $d$ for receiving, and for supporting, in inverted position, a bottle $e$ containing a cleaning solution. The container $c$ is provided with discharge cocks $f$. The described construction may be, if desired, the same as that set forth in said application, in which the construction is shown and described in more detail.

In the drawings of the present case, two frames $a$ are shown. A vertically disposed pipe $h$, having two valved inlet pipes $i$ and $j$, extends to a horizontal pipe $k$, which is provided with cocks $m$ adapted for connection with the milk tubes $z$ of the teat cups $x$. A receptacle $n$ for a washing compound may be connected, through a valved pipe $o$, with the T at the junction of the pipes $i$, $j$, and $h$.

In operation, if the milking machine unit is provided with a claw comprising a milk tube cluster and a pulsator with an attached air tube cluster, the pulsator and air tube cluster are detached from the claw, but the milk tube cluster $y$ and the milk tube $z$ are left assembled and suspended from the teat cups, and the several milk tubes are connected with the several cocks $m$.

Cold water under full pressure is then forced through pipes $i$, $h$ and $k$ and the milk tubes $z$ and teat cups $x$ until the water runs off clear. The valve in cold water pipe $i$ is then partly turned off and steam is turned on by opening the valve in pipe $j$. Scalding water is thus forced through the milk tubes and teat cups for several minutes, thus thoroughly boiling out these parts. By opening the valve in pipe $o$, a washing compound (for example, a soap-soda solution) may be added to the hot water. After the admission of the washing compound is shut off, the flow of hot water should be continued in order to rinse out the soap and soda. Finally, the cold water valve should be closed and live steam blown through to sterilize the parts, or they may be sterilized with a chemical solution, or with both.

After the washing has been completed, the milk tubes $z$ are detached from the cocks $m$, drained, and attached to the cocks $f$. The cocks $f$ should first be momentarily opened to drain off any wash water that may have splashed into the chamber $c$. A bottle $e$, containing a cleaning solution, is then inverted and deposited on the support $d$. The solution escapes from the bottle and fills the container $c$ to just above the level of the mouth of the bottle. Further escape of the solution is prevented by the pressure of the atmosphere balancing the column of solution and the partial vacuum in the bottle above the solution. Cocks $f$ are now opened and the solution fills the tubes $z$ and teat cups $x$, the solution continuing to escape from the bottle so as to maintain the level of cleaning fluid in the container until the teat cups are filled.

Figure 3:
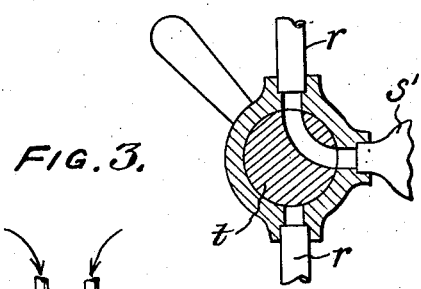
Fig. 3 is a detail sectional view of the valve for controlling the circulation of water in the modified apparatus.
Figure 2:
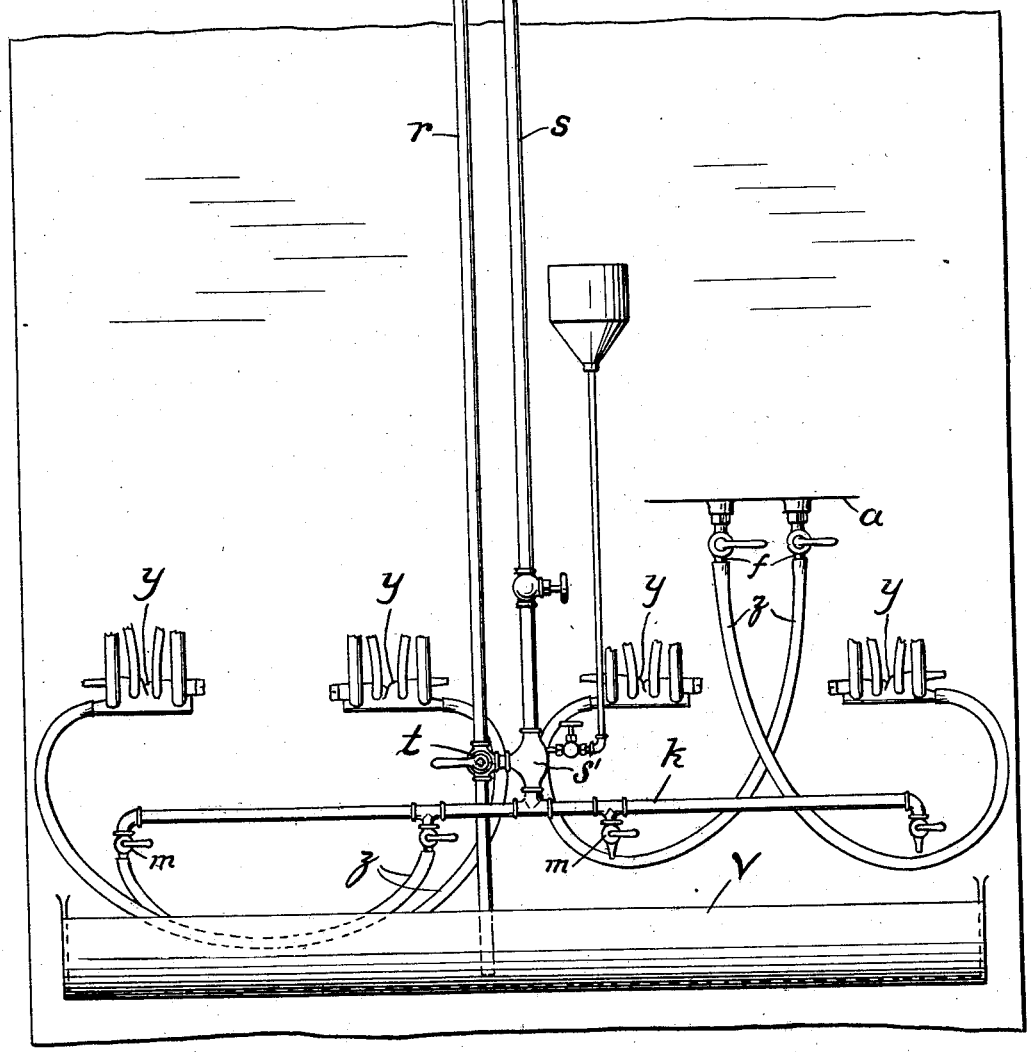
Fig. 2 is a perspective view of a modification.

In Fig. 2 the construction is in principle the same as in Fig. 1, but differs in detail therefrom in the following particulars. The steam pipe s is directly connected with pipe k, and the cold water pipe r is equipped with a three-way valve t controlling a short pipe connection to a T s' on pipe s. The cold water pipe r extends down into a tank v. Valve t is first turned to the position shown in Fig. 3 to connect the upper or inlet end of cold water pipe r with the T on pipe s. The cold water overflowing from the teat cups collects in tank v. When it is desired to arrest the flow of cold water and supply hot water, valve t is turned 90° to the right of the position shown in Fig. 3 to connect the lower end of pipe r with the T on pipe s. When steam is turned on, water is drawn from the tank v up through the lower end of pipe r past the valve t into the steam connection, thereby heating the water and forcing hot water through pipe k, the milk pipe z and the teat cups. As long as this condition is established, the same water is recirculated through these parts. This operation may be followed by the addition of a washing compound to the hot water stream and by sterilizing with live steam, or otherwise, as above described. In the steam sterilizing operation, valve t is turned to an intermediate position.

Instead of supporting the teat cups on the racks that are also intended and used for supporting the teat cups while they are connected with the container c, the teat cups may be supported on other racks positioned over a special sink; and, if the washing operation, while the teat cups are on these racks, is to be followed by the supply of special cleaning fluid intended to remain in the teat cups until they are again used in the milking operation, the teat cups, after the washing operation, are removed from the last named racks and transferred to racks positioned like those shown in Fig. 1.

Having now fully described my invention, what I claim and desire to protect by Letters Patent is:

1. A device for use in cleaning the teat cups and milk tubes of milking machines, which comprises a rack adapted to support the teat cups with their milk tubes depending therefrom, a header, means on the header to receive the milk tubes, a tank, a cold water pipe having a discharge end extending into the tank and an admission end, a steam pipe communicating with the header, and a three-way valve on the cold water pipe adapted to be operated to connect either the admission end or discharge end of the cold water pipe with the steam supply.

2. A device for cleaning the teat cups and milk pipes of milking machines, which comprises a water-receiving tank, a horizontally extending header above the tank, cocks on the header adapted for connection with the milk tubes of teat cups, a rack outside and above the tank adapted to support the teat cups in position to allow overflow of water therefrom into the tank and with their milk tubes in position for attachment to said cocks as specified, a cold water pipe and a steam pipe, a common fluid flow connection from each pipe to the header, and valve mechanism adapted to be operated to connect either pipe alone or both pipes with the header to permit circulation of cold water, hot water or steam through the header and all in the same direction through the teat cups and their tubes.

In testimony of which invention, I have hereunto set my hand at Chicago, Illinois, on this ninth day of April, 1928.

HERMAN C. BECKMAN.